Aug. 12, 1930.  C. BIRDSEYE  1,773,081
REFRIGERATING APPARATUS
Original Filed June 18, 1927  4 Sheets-Sheet 1

Fig.1

Clarence Birdseye
INVENTOR
BY
ATTORNEY

Aug. 12, 1930.   C. BIRDSEYE   1,773,081
REFRIGERATING APPARATUS
Original Filed June 18, 1927   4 Sheets-Sheet 2

INVENTOR
Clarence Birdseye
BY
ATTORNEY

Aug. 12, 1930.    C. BIRDSEYE    1,773,081
REFRIGERATING APPARATUS
Original Filed June 18, 1927    4 Sheets-Sheet 4

Clarence Birdseye INVENTOR
BY *Holmes*
ATTORNEY

Patented Aug. 12, 1930

1,773,081

UNITED STATES PATENT OFFICE

CLARENCE BIRDSEYE, OF GLOUCESTER, MASSACHUSETTS, ASSIGNOR, BY MESNE ASSIGNMENTS, TO FROSTED FOODS COMPANY, INC., OF DOVER, DELAWARE, A CORPORATION OF DELAWARE

REFRIGERATING APPARATUS

Original application filed June 18, 1927, Serial No. 199,693. Divided and this application filed July 7, 1928. Serial No. 290,976.

This invention relates to a refrigerating machine or apparatus. While my new machine or apparatus is useful wherever it is desired to quickly chill or freeze an article, I shall in this specification illustrate its operation as applied to the preserving of food products by refrigerating the same, preferably by "quick" freezing such a product into a frozen block in which the pristine qualities and flavors of the product are retained for a substantial period after the product has been thawed.

In my co-pending application Serial No. 199,693, filed June 18, 1927 (of which the present application is a division), I have disclosed a novel method of cooling or freezing food products or comestibles, such as fish and meat, which results in preserving the natural qualities and flavors of the comestible substantially unimpaired for a substantial period of time even after the product has been thawed. By my new method and apparatus I am able, by means which are economical and commercially practical, not only to effect any desired degree of refrigeration but also to quick freeze a comestible into a compact frozen block, the comestible, if desired, being frozen in the package or container in which it is to be marketed.

For example, an important field of utility for this machine or apparatus resides in the preparation of dressed fish for the market. According to the method which I will illustrate, I first form the fish into a compact block or slab, consolidating it and freeing the mass from air so far as possible. By reducing the volume of air and the voids in the package, the block may be frozen more rapidly and efficiently and the opportunity for the multiplication of bacteria is reduced. Preferably the block or slab is encased in the wrapper or carton in which it is later to be marketed, and it is advantageous to make this block comparatively thin so that it will be more quickly frozen throughout its mass. The block or slab of fish so prepared is next frozen so rapidly and at such a low temperature that the cells of the fish tissue are substantially unbroken. Thus the original qualities and flavors of the fish are retained and the product returns substantially to its original condition upon thawing.

The present invention provides a machine with which articles, including comestibles such as that described, or of any other suitable character, can be frozen very quickly or rapidly chilled to any desired degree and at an entirely reasonable expense. For example, the invention makes it possible for the first time, so far as I am aware, to produce in a practical and commercial way a compacted quick frozen block of food products or comestibles, preferably frozen in the package in which it is to be marketed. Such a block can be stored for a long period of time, transported and marketed at a distance, and then after being thawed will be found in substantially the same condition as before freezing.

I will now describe a preferred embodiment of my invention by referring to the accompanying drawings in which like reference numerals indicate similar parts throughout the several views.

Figure 1:
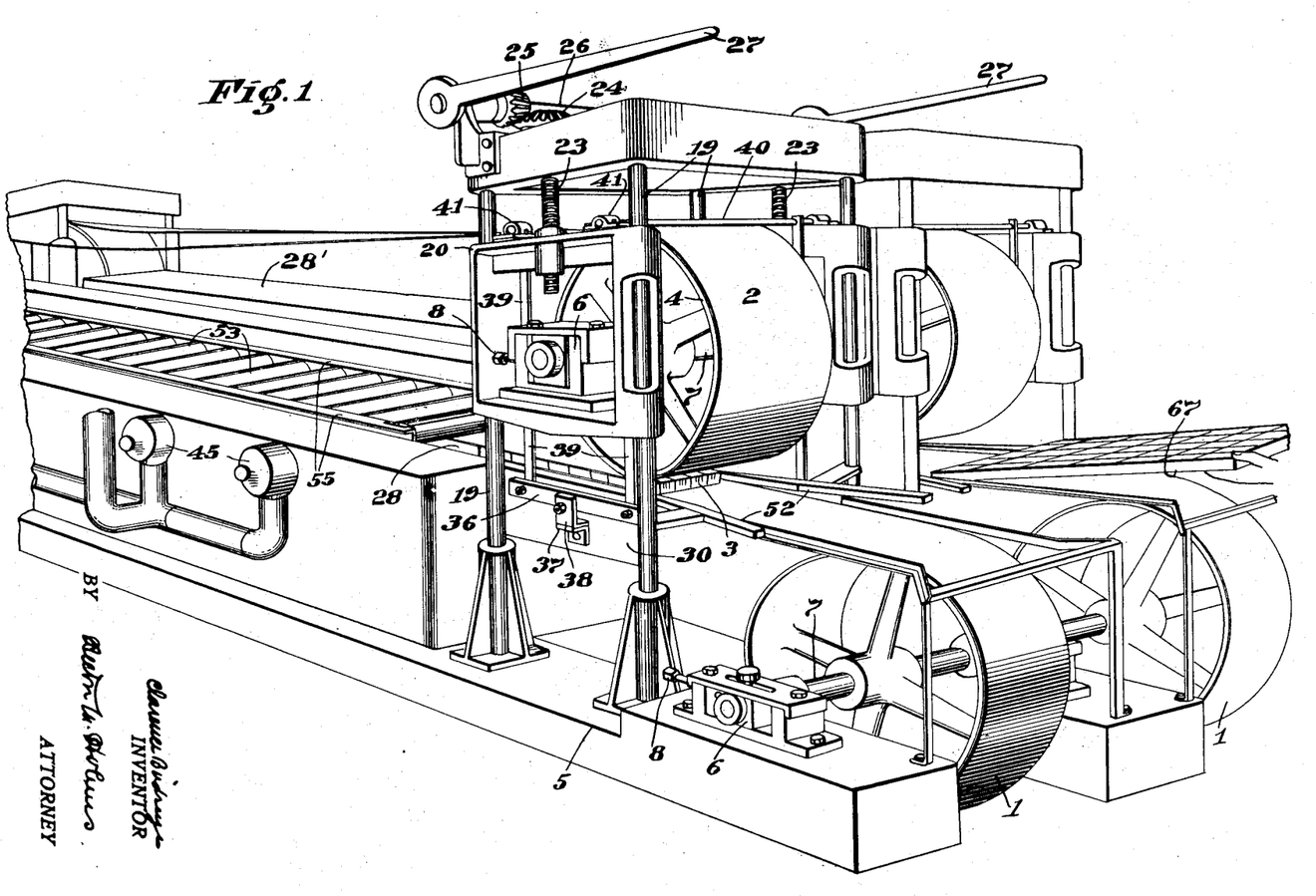
Figure 1 is a perspective view of an apparatus constructed in accordance with my invention, looking at the front or feed end thereof (in this view the cover is removed from the freezing chamber of the nearer machine and the spray pipes for the upper conveyor are not shown)

In the specific embodiment of the apparatus illustrated in said drawings, the reference numeral 1 indicates a lower belt conveyor, substantially parallel to which and above which is an upper belt conveyor 2. The article to be refrigerated, shown in the drawing as a food product packed in cartons 3, preferably of substantially uniform height, is carried from one end of the machine to the other between the upper reach of the lower conveyor 1 and the lower reach of the upper conveyor 2. It is to be understood that said conveyors each pass around appropriate drums or wheels 4, so as to provide for continuous operation in one direction, and also that the lower reach of the upper conveyor and the upper reach of the lower conveyor are both moving at substantially the same speed in the same direction. As the apparatus is preferably constructed, the upper conveyor is shorter than the lower conveyor, thus affording accommodation at the end at which the article is introduced, to deliver said article to the lower conveyor without interference by the upper conveyor. After said article has been delivered to the lower conveyor, it then passes beneath the upper conveyor and in contact with both conveyors. The particular apparatus shown in the drawings, and more especially in Fig. 1, is a double machine, that is, one in which there are two pairs of conveyors, but this may be altered to employ only one pair or as many as found necessary or desirable. The two pairs of conveyors are duplicates and from this point on I will refer to and describe the machine as if consisting of only one pair.

Figures 3, 4:
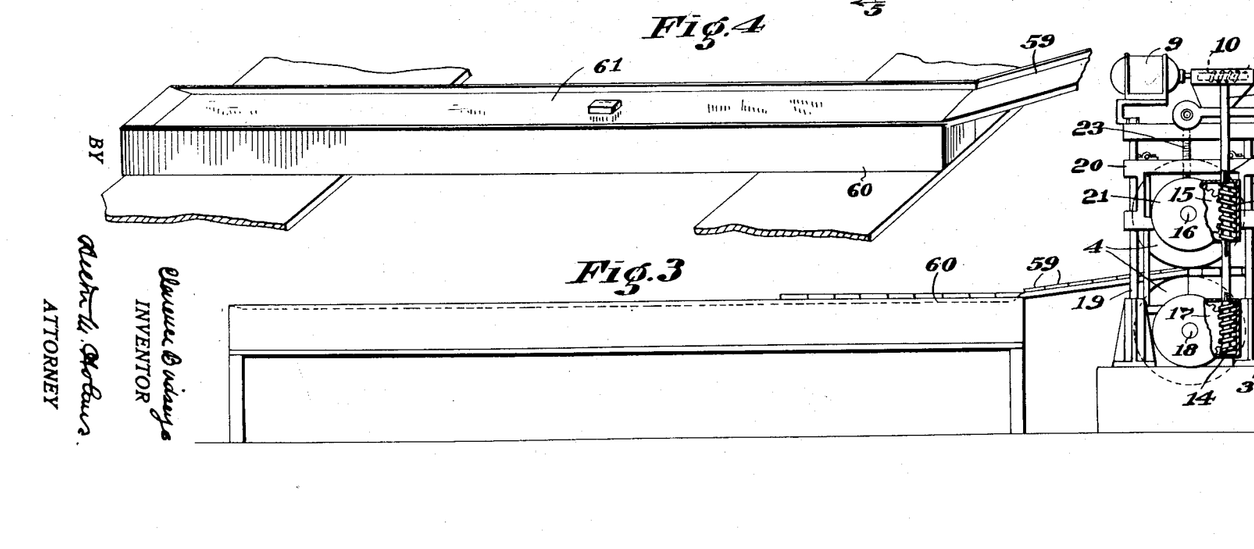
Figure 3 is a side elevation in continuation of Figure 2, showing the discharge end of the apparatus.
Figure 4 is a perspective view of the package receiving trough at the discharge end of the apparatus.

The apparatus furthermore includes a suitable framework 5 and adjustable bearings 6 at the feed end of the machine for the axle 7 of the wheel 4 for each conveyor, with tightening means 8 by which proper tension may be applied to the conveyors. The conveyors are preferably actuated simultaneously from a source of power, such as a motor 9 (see Fig. 3), through appropriate drive means. As shown, said motor actuates a worm 10 herein illustrated as upon the motor shaft. Said worm is in mesh with a worm wheel 11 at the upper end of a vertical drive shaft 12. On said vertical drive shaft are worms 13 and 14 for the upper and lower conveyors respectively, upper worm 13 being in mesh with a worm wheel 15 on the axle 16 for the driving wheel or drum of the upper conveyor, and the lower worm 14 is in mesh with a similar worm wheel 17 on the axle 18 for the driving drum of the lower conveyor. Both conveyors will therefore be actuated at the same speed by utilizing worms and worm wheels of the same size and character.

The upper conveyor is preferably arranged to have a vertical adjustment, this adjustment being substantially the same at both ends of the machine as shown. The framework includes two pairs of vertical guide rods or slideways 19 at each end of the machine, the four guide rods at each end of the machine supporting two vertically adjustable housings or riders 20, and said housings or riders providing appropriate bearings at opposite sides for the axle of the conveyor drum. At the drive end of the machine each housing 20 includes a gear case 21 for the upper worm 13 and its worm wheel 15. The drive shaft 12 and worm 13 have a sliding slot and key engagement 22 of a usual kind, so that as the housing 20 is moved up and down there will be no interference with the operation of said worm and its worm wheel. Vertical adjustment of each housing as a whole is obtained by means of vertical screws 23 at each side of the said housing and operated through bevel gears 24 (Figs. 1 and 5) on the upper end thereof in mesh with cooperating bevel gears 25 on a horizontal cross shaft 26, which in turn has an appropriate operating arm 27 on the outer end thereof. The structure and support for the upper adjustable conveyor and the drive means for both conveyors is such as to afford ready adjustment and a constant driving of the two conveyors in perfect synchronism.

Figure 5:
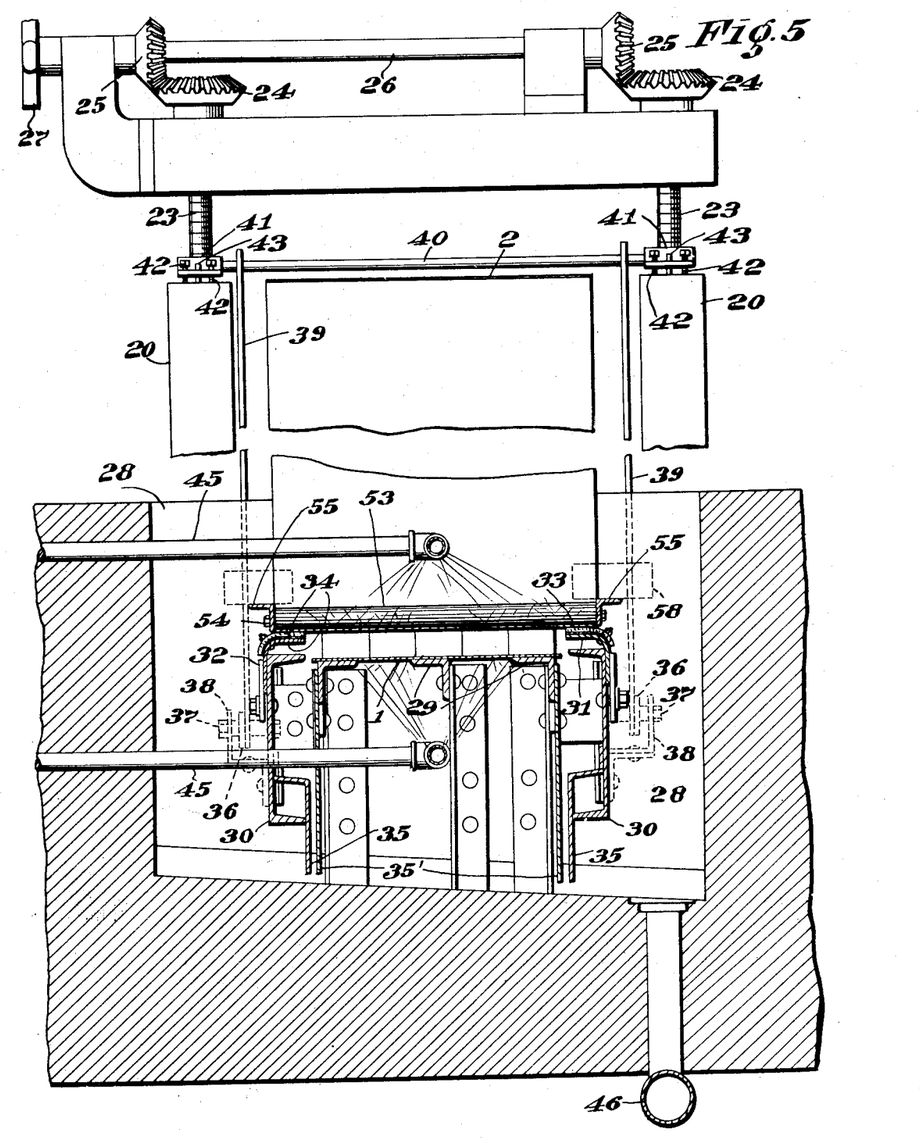
Figure 5 is a cross-sectional view, partly in end elevation, as upon line 5—5 of Figure 2.
Figures 6, 7:
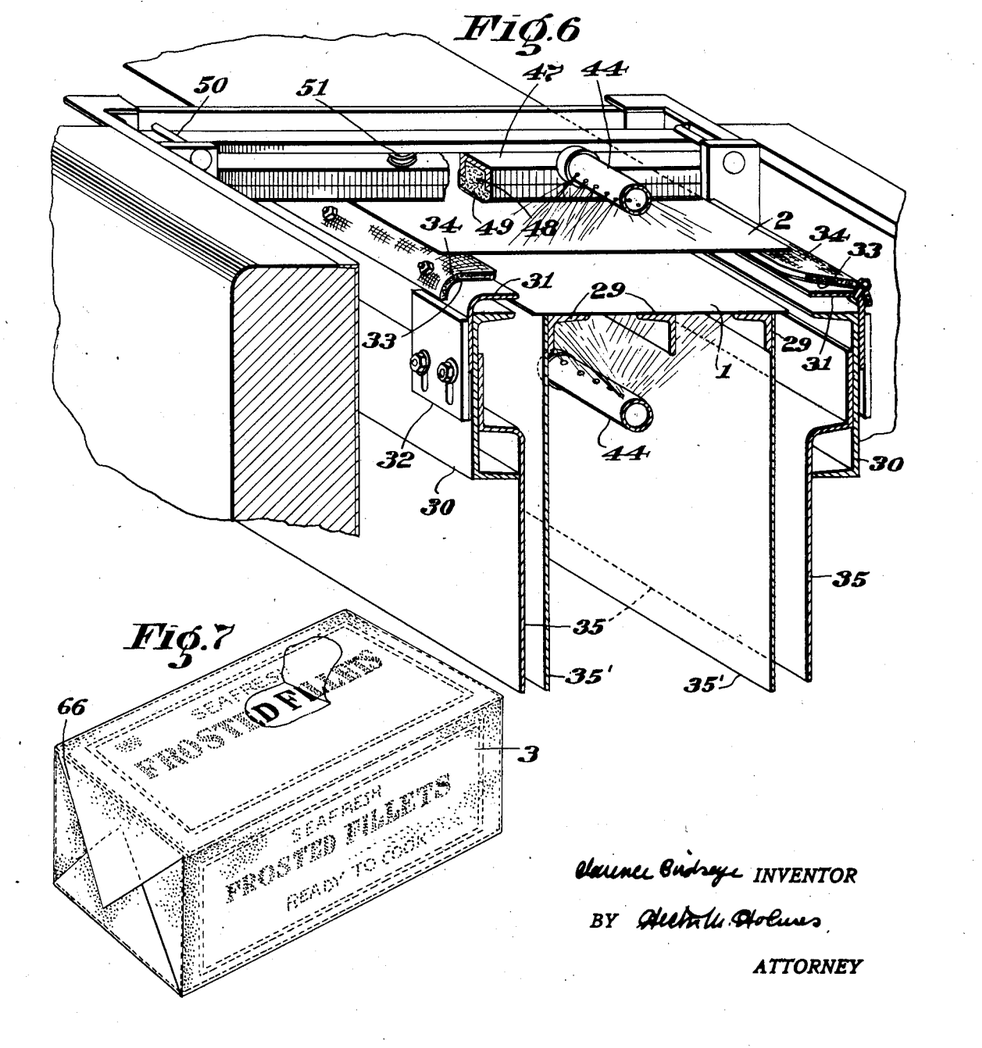
Figure 6 is a cross-sectional isometric view at the discharge end of the freezing chamber.
Figure 7 is a perspective view of a completed package prepared in accordance with my invention.

The lower reach of the upper conveyor and the upper reach of the lower conveyor pass longitudinally through a suitable chamber 28, the walls of which are of heat insulating construction so as to conserve the cooling medium as much as possible and also to aid in the rapidity with which said medium may effect its purpose. Said chamber 28 has an appropriate removable top cover 28'. Running through said chamber 28 are longitudinal tracks or supports located beneath the edges of the conveyors, the supports for the upper conveyor being more fully described below and the supports for the lower conveyor being designated by numerals 29, 29 (Figs. 5 and 6). These supports 29, 29 extend longitudinally under the upper reach of the lower conveyor in a horizontal plane and close enough together to permit a considerable pressure to be applied to the conveyor or belt without bending or flexing the same.

Support for the lower reach of the upper belt is herein shown as comprising a pair of channel irons 30, 30 which run parallel to each other, and substantially under the longitudinal edges of said belt as shown in Fig. 6. Along the longitudinal upper margin of the side wall of each of said channel irons, I adjustably secure an angle iron support 31, with its depending flange frictionally held to the channel iron 30 at intervals by clips 32, thus enabling the upper flange of support 31 to be adjusted quite accurately in a longitudinally horizontal position, even though channel irons 30, 30 may sag or otherwise be out of true horizontal alinement. The said upper flange of support 31 projects inwardly over the top of said channel iron support 30. Preferably the juncture between the vertical and horizontal flanges of said angle iron 31 is rounded or curved rather than angular, and on this curved edge and projecting inwardly over the angle iron is secured a resilient or spring metal strip 33, here shown as faced with a strip of fabric 34. The parts are so positioned and related that the margin of the lower reach of the upper belt will rest upon the upper margin of the facing strip 34 and, by its own weight or the application of additional weight, be made to depress the facing strip and spring strip, thus securing constant contact irrespective of irregularities in the belt or support therefor.

The supports are so arranged that liquid on the upper conveyor in flowing off the side edges thereof will be carried also over the outside of said facing strip 34 and on the outside of support 30 and thence drop downwardly past said support 30, which extends below the plane of the lower conveyor, thereby preventing said liquid from entering between said conveyors. The close engagement of the underside of the belt with the fabric strip 34 will prevent the freezing liquid from creeping along the under side of the upper belt and thus gaining access to the space between the belts. As an added precaution, I have shown an apron 35 secured on the inside of the channel support 30 and depending therefrom substantially to the bottom of the chamber 28 to prevent vapor or splash from the upper belt in any way gaining access to the space between the belts.

The weight of the lower belt, to which is added the weight of the articles being frozen, and the pressure of the upper belt, makes a liquid tight contact between the lower belt and its supporting members 29, which prevents the freezing liquid passing beyond these edge supports and thereby getting into the space between the belts. I may also secure an apron 35' to the outside edges of the outside supports 29 and depending therefrom approximately to the bottom of chamber 28 to further prevent liquid, vapor or splash from the lower belt in any way gaining access to the space between the belts. If desired, the aprons 35 and 35' may extend to and make a seal with the bottom of chamber 28 to further avoid any vapor of the freezing liquid gaining access to the space between the belts.

By the means just described, I am enabled to use a cooling solution which would adversely affect the product to be refrigerated if it should come in contact therewith.

The conveyors which I use are preferably imperforate metal belts which shield the article being frozen from any freezing fluid which is being used, and yet the arrangement is such as to enable the conveyors to be in direct contact with the article so as to obtain rapid cooling thereof by conductivity. It may be here noted that the prevention of contact between the freezing liquid and the article being frozen is further aided by employing an upper conveyor of greater width than the lower conveyor.

In the preferred construction of apparatus, the channel supports 30 are carried by hangers from riders on housings 20 so as to be moved up and down with said housings when an adjustment for a different sized article is desired. In carrying out this feature of the invention, the supporting channels 30 are shown as projecting from the end of the refrigerating chamber to a position between the several vertical guide rods at both ends of the machine. Since support for each end of each channel iron 30 is by similar means, only one such support will be described. On the outside of the channel 30, substantially parallel thereto, is a lower bar 36 forming part of said hanger. This bar 36 is shown attached at a central point by a bolt 37 and bracket 38 to said channel support, and at each end of said bar is secured a strap 39 which depends thereto from the previously described housing or rider 20, this support being effected through the agency of a cross rod 40 (Fig. 5) extending across from one side of said rider to the other. Each end of each cross rod 40 is adjustably mounted on the rider by being secured to a cleat 41 having elevating set screws 42 at its corners which rest upon the top of the rider for raising said cleat to any desired position. Lateral movement of said cleat is prevented by central vertical studs 43 which are slidable through the cleat and which project upwardly from a fixed position in the rider. By this means, the channel supports 30 may be independently adjusted with respect to the upper belt wheels.

Suitable spray pipes 44 are arranged above the lower reach of the upper conveyor and below the upper reach of the lower conveyor within the chamber 28. In the present showing, these spray pipes are shown in longitudinal sections, with a feed pipe 45 leading to each section, so as to secure an adequate spray under proper pressure of the cooling fluid or medium. Where the fluid is liquid, it is desirable to drain the same off and re-use it, so I have shown the bottom of said chamber as sloping and leading to a suitable drain pipe 46 by which proper disposal of the fluid may be made. If the aprons 35 and 35' make a seal with the floor of chamber 28, additional drain pipes should be used.

Figure 2:
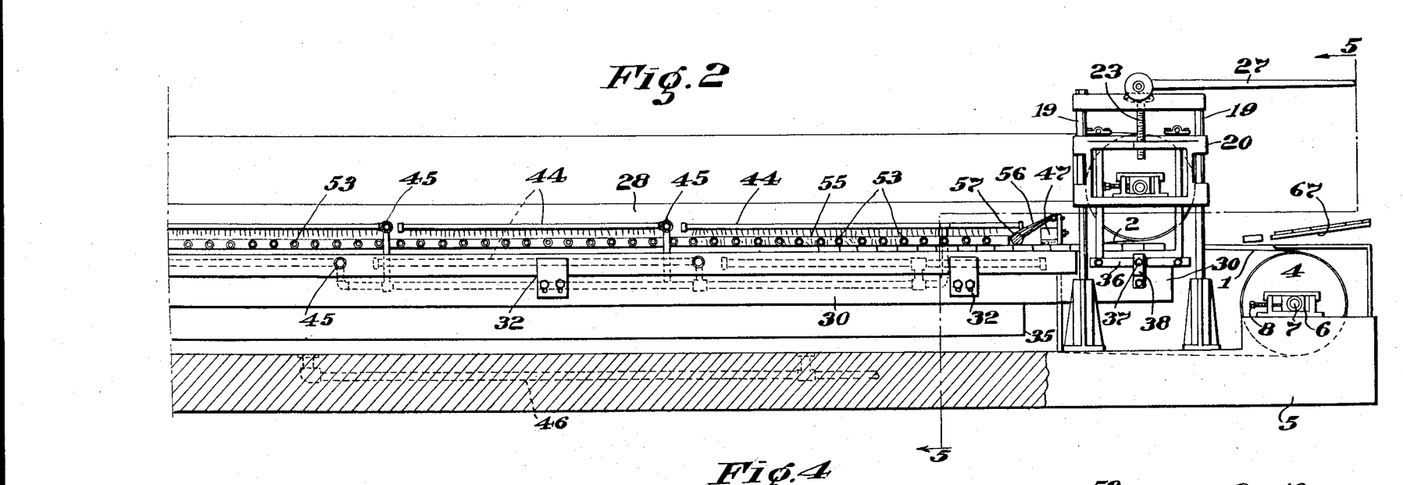
Figure 2 is a side elevation partly in longitudinal section of the front end and central portions of said apparatus.

It is desirable to prevent the cooling fluid from passing out of the cooling chamber along the upper surface of the lower reach of the top belt, and to prevent this from occurring, the top pulleys are preferably adjusted with relation to the bottom pulleys so that the distance between the pulleys is greater than the thickness of the product which gives a slight slope to the lower reach of the top belt at both ends. This slope is shown at the feed end in Fig. 2. This slope tends to cause any fluid on the belt at that position to flow back toward said chamber. More positive means may also be provided for holding the fluid back, such as a transverse wiper 47. This wiper should be of a construction not affected by the severe cold to which it is subjected so as to become stiff and useless. As one practical form of wiper, I have shown in Fig. 6 an inverted box filled with cotton waste or other soft material 48, with the lower side closed by a flexible material 49, such as canvas, which bears on the entire width of the belt. The wiper box is confined between pieces bolted to the end of the tank by bolts 50 and pressed toward the belt by a spring 51. Such a wiper is preferably used at both the entrance and exit to the chamber 28 for each belt, the one for the upper belt acting upon the upper side of the lower reach, and that for the lower belt acting upon the under side of the upper reach.

At the front or feed end of the machine, it is preferable to extend the lower conveyor forwardly in front of the upper conveyor so as to receive the article thereon before introducing it between said conveyors. At this front or feed end of the lower conveyor, I preferably provide guides 52 (Fig. 1) for automatically centering the article. These guides are preferably arranged one at each edge of the conveyor, sloping inwardly toward each other in the direction of movement of the conveyor. Where the product is of regular shape, as with cartons 3, the guides may be so positioned that the cartons will be pushed together transversely of the belt before entry under the upper belt.

For reasons which I will presently explain, I also preferably provide means herein for obtaining any desired pressure on the upper conveyor and therefore upon the article passing between the conveyors. While the weight of the upper conveyor belt itself may suffice in some instances, I prefer to supplement that weight, which I do in the present showing by use of a plurality of spaced rollers 53 resting upon and supported by the upper surface of the lower reach of the upper belt transversely thereof. Each of said rollers has longitudinally projecting central pintles 54 (see Fig. 5) which enter appropriate holes in the downwardly extending flange of an angle iron 55, said iron being divided into sections which permit corresponding series of rollers to independently adjust themselves to articles of varying thicknesses. Each section of angle iron 55 is loosely hinged to adjacent sections, and the sections are also anchored at the feed end, as by straps 56, extending from a fixed portion of the frame work, to anchor the rollers from moving longitudinally with the belt (see Fig. 2). This construction makes a floating pressure with a minimum of friction. The rollers are preferably positioned quite close together, and the first one 57, in the series, is also preferably heavier than the rest to secure initial positive action thereof on the article to be refrigerated. Where occasion requires, additional weights 58 (Fig. 5) may be added by resting the same on the horizontal flanges of the angle irons 55.

At the discharge end of the apparatus I provide, in the present showing, a short chute 59 to a trough 60, arranged herein in alinement with the direction of movement of the article from the conveyors. In said trough I preferably provide a smooth sheet of ice 61, upon which the product will slide with a minimum of friction on leaving the conveyors and chute 59. This acts as a convenient form of reservoir for reception of the articles from the conveyors, and will also serve to clean the bottom of the article from any foreign matter.

Figure 8:
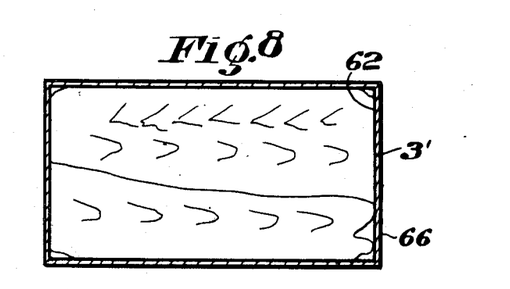
Figure 8 is a horizontal cross-sectional view of said package immediately beneath the cover.

As an example of a useful application of my invention, I will describe its application to the freezing of a packaged food product, such as dressed, fresh fish or meat, whereby said food product is quick frozen in the package or container in which it is to be marketed. The package preferably comprises a suitable container, such as the cardboard carton 3', which may be and is preferably waxed or otherwise rendered resistive to the passage or absorption of moisture. For further protection, the said container should preferably be lined with, or the contents wrapped in an appropriate waxed paper or other moisture proof material 62. I have attained satisfactory results by the use of a paraffined vegetable parchment paper, which does not disintegrate with exposure to moisture. The paraffin coating resists the passage of moisture and keeps the paper from sticking to the contents. As I prefer to carry out the invention, the container 3' is preferably positioned with the cover open and the protective material 62 placed therein prior to the introduction of the food contents. With the container thus standing open, a layer of the food product is placed in the bottom thereof. If the food product, for instance, is fish fillets, as indicated in Fig. 8 the fish, either as a single fillet, if of suitable size, or a plurality of fillets if required, is laid into said container. The fillets are of the usual irregular shapes when inserted in the container, and the parts which are too wide to go into the container flat may be crumpled, folded or squeezed to get them in, endeavoring so far as practicable to press the extra width of the fish toward the part of the container where the fish is not so wide. After the several layers and separators are inserted, the moisture proof lining or protective material 62 is laid over the top and the cover closed. By filling the carton as completely as possible with the food product or overfilling it, I insure intimacy of contact between the various layers or parts of the food, and between the container and the food, and a minimum of air pockets, so that there may be uniform and rapid heat transference throughout the mass and outward through the container itself.

After performing the steps as above outlined, unless the product is to be marketed very soon after freezing, the container is wrapped somewhat loosely, as in a waxed or paraffined paper 66, and this wrapping is substantially hermetically sealed by use of hot plates or otherwise.

I then introduce the packages into the space between the conveyor belts. The filled packages may be loaded into an open ended tray of suitable size, as shown at 67, Fig. 1, from which they can be readily delivered onto the upper reach of the lower conveyor belt and advanced into the space between the two belts, arranged closely side by side and end to end, and thence carried into the freezing chamber. The speed of the conveyors may be adjusted to move the article through the freezing chamber in the length of time necessary for freezing, or the article may be advanced into the chamber by the belts, the belts stopped and the article retained in the chamber the desired length of time, when the belts can be again put in motion to deliver the article from the machine. The vertical position of the upper belt having been adjusted in accordance with the thickness of the package to be treated, the packages as they are carried forward by the lower belt will be engaged by the lower reach of the upper belt. The lower belt offers a substantially unyielding support to the package, and the upper belt is pressed downwardly on the package by its own weight and by the pressure rollers when they are used. The result is that with a produce that is comparatively yielding, the mass is compacted, the product will tend to fill any voids in the carton, and any unevennesses are flattened out so that the product presents substantially even flat surfaces of substantial area, immediately juxtaposed against the sides of the carton, with which the belts are in contact. This insures a minimum of insulating air layers or spaces, and a heat conductive contact over a substantial portion of the surface area of the block of food product, which results in effective heat transference throughout the mass of the product, and uniform and complete freezing in the minimum length of time. The character of the package as above described retards any evaporation of the natural moisture of the food product, and any tendency to a loss of moisture from the package is further retarded by the intimate contact of the belts through which moisture cannot pass.

Also, in the course of freezing, the food product will expand, and it is desirable that this natural expansion should, so far as possible, be caused to take place in such manner as to fill out the container and yet not bulge or distort it, in order to increase the intimacy of contact between the various portions of the contents and between the contents and the container, with resulting uniformity and rapidity of freezing, and to insure that the completely frozen package shall not be bulged or distorted, but shall be sightly and regular in shape. This desirable result is insured by my apparatus by the holding of the package during the freezing period between the metal belts, which press on the package at top and bottom.

I have referred in this specification to quick freezing. While I am unable to define quick freezing in terms of exact temperatures or periods of time, the phrase will be readily understood by anyone familiar with the freezing of comestibles. Freezing may take place practically instantaneously, as by liquid air, or it may require days, as in the usual refrigeration in refrigerating rooms. In the case of such comestibles as fish or meat, for instance, if the freezing consumes any substantial period of time, the flesh is injuriously affected and it loses its natural flavor and qualities. By quick freezing I mean freezing in a sufficiently short space of time so that the cells of the food product are not disrupted or broken and whereby the frozen block, throughout its mass, retains its natural qualities, substantially unimpaired.

As an example of a satisfactory application of my machine to the quick freezing of comestibles, I would state that I attain highly satisfactory results in freezing cartons, two inches thick, packed as above described with fresh meat or fish, by passing such packages through the belts of my machine, and permitting each carton or package to remain under pressure in the freezing chamber, which is 37 feet long, about one hour and a quarter, while the belts are being sprayed with calcium chloride of about 33° Baumé, maintained at an average temperature of 45° below 0° F., the freezing fluid being supplied to the belts at the rate of about 200 gallons per minute. Of course, these figures can be varied widely according to circumstances and other freezing mediums can be used.

It is well understood that food products consist of a diversity of elements with varying freezing points, and that the freezing points of some of these elements are so low that in common commercial practice most food products are never completely frozen. I therefore mean by freezing the congealing of some or most of the constituent elements of the food.

While I have illustrated and described in detail an embodiment of my apparatus which I have found useful, I do not desire to be limited to the specific details thus illustrated and described; but intend to cover all apparates which fall within the spirit and scope of my invention, as defined in the following claims.

Having thus described my invention, what I desire to claim as new is:

1. An apparatus for freezing foods comprising two heat conductive plates supported in spaced relation and adjustable in their spaced relation to engage and compress between them food products of varying thicknesses, and means to maintain said plates at a freezing temperature while engaging said food therebetween, whereby said food is frozen through the agency of said plates.

2. An apparatus for freezing foods comprising two endless imperforate metal belts spaced apart and adapted to firmly compress between them a food product, and means to freeze said article while compressed between said belts.

3. An apparatus for freezing foods comprising a lower endless imperforate metal belt, a substantially unyielding support for the upper reach thereof, a second imperforate metal belt disposed above said first belt and with its lower reach substantially parallel to the upper reach of said first belt and yieldingly supported, said reaches of said belts being adapted to engage between them a food product, and means for freezing said product while engaged between said belts.

4. An apparatus for freezing foods comprising two endless imperforate metal belts in substantially parallel spaced relation, and adjustable in their spaced relation to firmly engage between them food products of varying thicknesses, and means to freeze a product engaged between said belts.

5. An apparatus for freezing foods comprising an imperforate metal plate adapted to support a food product, a second imperforate metal plate, means automatically to engage with said second plate the upper surface of a food product supported by said first plate with any desired degree of pressure, and means to freeze the product while engaged between said plates.

6. An apparatus for freezing foods comprising an imperforate metal plate adapted to support a food product, a second imperforate plate, means automatically to engage with said second plate the upper surface of a product supported by said first plate with any desired degree of pressure, means to freeze the product while engaged between said plates and means automatically to deliver the product, when frozen, from engagement with said plates.

7. An apparatus for freezing foods comprising an imperforate metal plate adapted to engage a food product, a second imperforate metal plate, means automatically to engage with said second plate with any desired degree of pressure a food product engaged by said first plate, whereby said product will be compressed between said plates, and means to freeze said product while compressed between said plates.

8. An apparatus for freezing foods comprising two endless imperforate metal belts arranged in parallel relation and adapted to engage between their adjacent reaches a food product, means to move said belts in synchronism and means to freeze a food product while engaged between said belts.

9. An apparatus for freezing foods comprising a metal plate adapted to engage a food product, a second plate supported in spaced relation to said first plate, and means for relatively moving said plates to firmly engage a food product therebetween and means for maintaining a plate at a freezing temperature, whereby said product will be frozen through the agency of said plate while compressed between the two plates.

10. An apparatus for freezing foods comprising two imperforate endless metal belts arranged in parallel relation with their adjacent reaches moving in the same direction and engaging a food product, means for flowing liquid freezing medium upon a defined intermediate portion of the upper surface of the lower reach of the uppermost belt, and means for limiting the longitudinal flow of said freezing medium upon said belt.

11. An apparatus for freezing foods comprising an imperforate heat conductive plate adapted to support a food product, a second imperforate heat conductive plate in adjustable spaced relation to said first plate, means to engage with said second plate the upper surface of a food product supported by said first plate with any desired degree of pressure, means to maintain the faces of said plates, while confining said product therebetween, so cold that said product will be frozen to any desired degree through the agency of said plates.

12. An apparatus for freezing foods comprising an imperforate heat conductive plate adapted to support a food product, a second imperforate heat conductive plate, means automatically to engage with said second plate the upper surface of a product supported by said first plate with any desired degree of pressure, means to maintain the faces of said plates at a temperature to freeze said product while confined between said plates, and means automatically to deliver the frozen article from engagement with said plates.

13. An apparatus for freezing foods comprising two imperforate surfaces spaced apart and arranged firmly to engage and confine between them a food product, means to freeze said product while engaged by said surfaces, and means for automatically delivering the frozen product from engagement with said surfaces.

14. An apparatus for freezing foods comprising two imperforate heat conductive surfaces spaced apart and arranged firmly to engage and confine between them a food product, means for applying a freezing medium to the outer faces of said surfaces while they are firmly engaging said product, and means for automatically delivering the frozen article from engagement with said surfaces.

15. An apparatus for freezing foods comprising an imperforate heat conductive member arranged to engage one side of a food product, a second heat conductive member arranged automatically to engage the other side of said product and to maintain it under a predetermined amount of pressure, means for simultaneously separating said members and releasing the product after a predetermined interval of time, and means for maintaining said members at a freezing temperature, whereby they act as agents for extracting heat from the article and freezing the same.

16. An apparatus for freezing foods having an imperforate heat conductive plate adapted to engage and support a food product, and means for supplying to the under surface of said plate a constant flow of liquid freezing medium, said means comprising spray pipes from which said liquid is sprayed upon the said under surface, whereby said plate may be maintained at substantially the same temperature as said liquid.

17. An apparatus of the character described having an imperforate heat conductive plate adapted to engage and support a food product, means spaced from the surface of the plate for spraying a freezing medium against the same, constructed and arranged to permit the medium freely to leave the plate, and means for collecting the medium so it may be used again.

18. An apparatus for freezing foods comprising two imperforate endless metal belts so positioned that one reach of each belt will be in substantially parallel spaced relation with a reach of the other belt, said reaches being adapted to engage and confine between them a food product, pulleys for said belts, means to freeze an article while engaged and confined between said belts, and means to move said belts in synchronism about said pulleys, said pulleys at the delivery end being so relatively positioned that there will be a simultaneous separation of said belts to automatically disengage from a frozen article at said delivery end of said apparatus.

19. An apparatus for freezing foods comprising a metal plate adapted to engage a food product, a second metal plate, means to engage with said second plate with any desired degree of pressure a food product engaged by said first plate, whereby said product will be compressed between said plates, and means to freeze said product while compressed between said plates.

20. An apparatus for freezing foods comprising a metal plate adapted to support an article to be frozen, a second metal plate, means to engage with said second plate the upper surface of a food product supported by said first plate with any desired degree of pressure, and means to freeze an article while engaged between said plates.

21. An apparatus for freezing foods comprising two imperforate heat conductive plates spaced apart and adapted to engage between them a food to be frozen, a refrigerating chamber, means for moving said plates into and out of said chamber, and means in said chamber for applying a freezing medium to the outer faces of said plates.

22. An apparatus for freezing foods comprising two imperforate heat conductive plates spaced apart and adapted to engage between them the food to be frozen, a refrigerating chamber, means for moving said plates into and out of said chamber, means in said chamber for applying a freezing medium to said plates and means to prevent said freezing medium from engaging said food.

23. An apparatus for freezing foods comprising an imperforate heat conductive plate adapted to engage and support a food product to be frozen, a refrigerating chamber, means for moving said plate into and out of said chamber, and means in said chamber for spraying liquid freezing medium against said plate and for collecting said medium within the chamber after it leaves the plate.

24. An apparatus for freezing foods comprising surfaces adapted to engage and confine between them a food product to be frozen, means to positively press said surfaces into firm engagement with said product and means to simultaneously freeze said product.

25. An apparatus for freezing foods comprising two heat conductive surfaces in spaced relation and adapted to confine and compress between them a food product to be frozen, means to adjust the spaced relation of said surfaces, a refrigerating chamber, means to move said surfaces into and out of said chamber, and means in said chamber for maintaining said surfaces at a freezing temperature.

26. An apparatus for freezing foods comprising two heat conductive surfaces adapted to confine a food product to be frozen, pressure means to compress said article between said surfaces and means to maintain said surfaces at a freezing temperature while they are compressing said product.

27. An apparatus for freezing foods comprising a refrigerating chamber, heat conductive surfaces adapted to engage and confine a food product to be refrigerated, means to move said surfaces while confining said food product into and out of said chamber, means within said chamber for maintaining said surfaces at a freezing temperature and positive pressure means for maintaining said surfaces in firm surface contact with said product while in said chamber.

28. An apparatus of the character described comprising a refrigerating chamber, an imperforate metal belt conveyor adapted to engage and support an article of food, means for moving said conveyor into and out of said chamber, and means in said chamber for flowing a cooling medium over the outer face of said conveyor, and then collecting it within the chamber after it leaves the conveyor.

29. An apparatus for freezing foods comprising two imperforate endless metal belts adapted to engage between them a food product, a refrigerating chamber, means for moving said belts into and out of said chamber, and means in said chamber for applying a freezing medium to the outer faces of said belts.

30. An apparatus for freezing foods comprising two endless metal belts adapted to engage between them a food product, a refrigerating chamber, means for moving said belts into and out of said chamber, means in said chamber for applying a freezing medium to the outer faces of said belts and means to prevent said medium from engaging said food product.

31. An apparatus for freezing foods comprising two imperforate endless metal belts spaced apart and adapted to confine between them a food product and means for applying a freezing medium to the outer faces of said belts, whereby said belts act simultaneously to extract heat from said food.

32. An apparatus for freezing foods comprising two endless imperforate metal belts in spaced relation and adapted to confine and compress between them a food product, means to adjust the spaced relation of said belts and means to maintain said belts at a freezing temperature.

33. An apparatus for freezing foods comprising two endless metal belts adapted to confine between them a food product, means to positively maintain said belts pressed in firm engagement with said food product, and means to simultaneously cool the outer faces of the food confining portions of said belts.

34. An apparatus for freezing foods comprising imperforate heat conductive conveyor belts adapted to confine between them a food product and means for applying a freezing medium to the outer faces of said belts.

35. An apparatus of the character described comprising two endless metal belts disposed one above the other and adapted to engage a food product between the lower reach of the upper belt and the upper reach of the lower belt, the upper belt being wider than the lower belt, and means for applying a refrigerating fluid to the outer faces of the food engaging reaches of said belts.

36. An apparatus of the character described comprising two endless metal belts disposed one above the other and adapted to engage a food product between the lower reach of the upper belt and the upper reach of the lower belt, means for applying a refrigerating fluid to the outer faces of the product engaging reaches of said belts and means to prevent said fluid from entering the area between said reaches and engaging said product.

37. An apparatus for freezing foods comprising a lower endless metal belt, a substantially unyielding support for the upper reach thereof, a second metal belt disposed above said first belt and with its lower reach substantially parallel to the upper reach of said first belt, said reaches of said belts being adapted to confine between them a food product, a yielding support for the lower reach of said upper belt, pressure means to press said lower reach firmly against the support, and means for applying a freezing medium to the outer faces of said reaches of said belts.

38. An apparatus of the character described comprising upper and lower metal conveyors in substantially parallel relation and adapted to confine between them a food product, a substantially unyielding support for said lower conveyor, means for applying a refrigerating fluid to the outer face of said upper conveyor, fluid confining supports for said upper conveyor, means for pressing said upper conveyor toward the lower conveyor, whereby the upper conveyor will be pressed against said food product and whereby a fluid seal joint will be formed between said conveyor and said supports to prevent the passage of said refrigerating fluid into the space between said conveyors.

39. An apparatus for freezing foods comprising upper and lower imperforate metal conveyors adapted to confine between them a food product, means to move said conveyors in synchronism and means to apply a freezing medium to the outer faces of said conveyors while the conveyors shield the product from contact with said medium.

40. An apparatus for freezing foods comprising two endless metal belts disposed one above the other and adapted to engage a food product between the upper reach of the lower belt and the lower reach of the upper belt, a plurality of rollers supported by the lower reach of the upper belt to maintain said reach pressed firmly in engagement with said product, and means to apply a freezing medium to the outer faces of said reaches of said belts.

41. An apparatus for freezing foods comprising two imperforate endless metal belts disposed one above the other and in substantially parallel spaced relation, and adapted to confine between them a food product, the lower belt extending forwardly of the upper belt at the feed end of the machine, means to move said belts in synchronism whereby a food product supported by said lower belt will be moved into engagement at its upper surface with said upper belt, and means to freeze said product while thus engaged by said belts.

42. An apparatus for freezing food products comprising two imperforate endless metal belts so positioned that one reach of each belt will be in substantially parallel spaced relation with a reach of the other belt, said reaches being adapted to engage and confine between them a food product, pulleys for said belts, means to freeze an article while engaged and confined between said belt, and means to move said belts in synchronism about said pulleys, whereby said belts will engage said products at the feed end of the apparatus and will automatically disengage from said frozen article at the delivery end of said apparatus.

43. An apparatus for freezing foods comprising upper and lower imperforate metal conveyors adapted to confine between them a food product, means for firmly supporting said lower conveyor, pressure means for pressing said upper conveyor against said article, said pressure means comprising a plurality of rollers supported in spaced relation by said upper conveyor, means to move said conveyors and means to apply a freezing medium to the outer faces thereof while confining said product.

44. An apparatus of the character described comprising two endless imperforate metal belts adapted to engage and confine between them a food product, a refrigerating chamber, means to move said belts into and out of said chamber, spray pipes adjacent the outer faces of said belts in said chamber and adapted to spray a freezing fluid on said outer faces, means for supporting said conveyors in parallel spaced relation in said chamber, said supporting means engaging said belts adjacent their marginal edges with a fluid seal contact, and aprons depending from said marginal supports, whereby said fluid is prevented from penetrating into the area between said belts.

45. An apparatus of the character described comprising two metal belts disposed one above the other and adapted to engage and confine between them a food product, a refrigerating chamber, means to move said belts into and out of said chamber, means in said chamber to apply a freezing fluid to the outer face of the lower reach of the upper belt and a wiper held in frictional engagement with said upper face adjacent the delivery end of said chamber to prevent the passage of freezing fluid from said chamber on said belt.

46. An apparatus of the character described comprising upper and lower endless imperforate metal belts adapted to engage and confine between the lower reach of the upper belt and the upper reach of the lower belt a product to be frozen, a refrigerating chamber, means to move said reaches into and out of said chamber, pressure means to maintain said reaches in firm engagement with said article, spray pipes in said chamber above the lower reach of the upper belt and below the upper reach of the lower belt and adapted to spray a freezing fluid upon the outer faces of said reaches, and means to prevent said fluid from penetrating into the area between said reaches.

47. An apparatus for freezing foods comprising surfaces adapted to engage and confine between them a food product to be frozen, means to press said surfaces into firm engagement with said product with a uniform pressure regardless of the thickness of the product, and means to simultaneously freeze said product.

48. An apparatus for freezing foods comprising two plates adjustably supported in spaced relation and adapted to engage between them food products of varying thicknesses and maintain under continuous pressure a product thus engaged and means to freeze said food while engaged and compressed by said plates.

49. An apparatus for freezing foods comprising two plates supported in spaced relation and adapted to engage between them a food product and maintain said product under uniform pressure and means to freeze said food while engaged and compressed by said plates.

50. An apparatus for freezing foods comprising two plates supported in spaced relation, and adapted to engage between them a food product, means for varying said spaced relation and compressing said plates against said food product with uniform pressure and means to freeze said food while engaged and compressed by said plates.

In testimony whereof I have signed my name to this specification.

CLARENCE BIRDSEYE.